United States Patent [19]
Kingsford et al.

[11] Patent Number: 5,261,442
[45] Date of Patent: Nov. 16, 1993

[54] DIAPHRAGM VALVE WITH LEAK DETECTION

[75] Inventors: Kenji A. Kingsford, Devore; Hy B. Nguyen, Upland, both of Calif.

[73] Assignee: Bunnell Plastics, Inc., Mickelton, N.J.

[21] Appl. No.: 971,299

[22] Filed: Nov. 4, 1992

[51] Int. Cl.⁵ .................. F16K 11/048; F16K 31/126
[52] U.S. Cl. ................. 137/312; 137/625.5; 137/625.66; 251/61.3; 251/282
[58] Field of Search ............... 137/312, 625.5, 625.66; 251/61.3, 282

[56] References Cited

U.S. PATENT DOCUMENTS

| | | | |
|---|---|---|---|
| 3,303,852 | 2/1967 | Miller | 137/87 |
| 3,540,478 | 11/1970 | Ito | 137/625.5 |
| 3,546,690 | 10/1970 | Kalert, Jr. | 340/242 |
| 3,794,075 | 2/1974 | Stoll et al. | 137/625.66 |
| 3,838,707 | 10/1974 | Wachowitz, Jr. | 137/312 |
| 4,010,769 | 3/1977 | De Lorenzo et al. | 137/312 |
| 4,694,848 | 9/1987 | Jorgensen et al. | 137/114 |
| 4,711,269 | 12/1987 | Sule | 137/625.5 |
| 4,776,368 | 10/1988 | Drozd | 137/505.43 |
| 4,794,940 | 1/1989 | Albert et al. | 137/1 |
| 4,821,776 | 4/1989 | Ariizumi et al. | 137/625.5 X |
| 4,901,751 | 2/1990 | Story et al. | 137/312 |
| 4,971,523 | 11/1990 | Wacker et al. | 417/63 |

Primary Examiner—Gerald A. Michalsky
Attorney, Agent, or Firm—Christie, Parker & Hale

[57] ABSTRACT

A diaphragm valve is provided which can be used both with corrosive liquids without valve component degradation and with chemically pure liquids without deleteriously affecting the liquids' purity. The valve incorporates a valve body having at least one inlet and at least one outlet, with a valve seat between each inlet and outlet. A pair of spaced-apart diaphragms are provided which are in contact with the fluid flowing through the valve. A poppet assembly, which extends between the diaphragms, incorporates a valve stem with a valve plug on one or both ends which engages an associated valve seat. A leak detection port is provided to detect liquids which may leak through either one of the two diaphragms.

43 Claims, 7 Drawing Sheets

DIAPHRAGM VALVE WITH LEAK DETECTION

FIELD OF THE INVENTION

This invention relates to valves which can be used both with corrosive liquids without valve component degradation and with chemically pure liquids without deleteriously affecting the liquids' purity. The valves incorporate diaphragms which are in contact with the liquids and components which provide for detection of any liquids which may leak through the diaphragm.

BACKGROUND OF THE INVENTION

Various types of fluid flow control valves are used in applications where the valve is subjected to corrosive acidic or caustic liquids or where the purity of the liquids which flow through the valve must be maintained. Such valves are constructed of relatively inert materials, e.g., fluoropolymers or other polymeric materials, or the valve surfaces which come into contact with the flowing liquids, or which potentially can come into contact with the liquids, are coated with inert materials.

Such flow control valves are commonly biased closed by a spring force and are opened by means of a solenoid actuator, or by pneumatic or hydraulic pressure, or the like. When valve closure springs are used, it can be important that the force required to be exerted by the spring to close the valve is minimized. By minimizing the required spring force, the spring imparts less stress to the valve structures, thereby increasing the length of valve life.

Fluid control valves sometimes include a diaphragm which is in contact with the fluid and which provides a barrier against escape of the fluid into the valve operating mechanism or into the atmosphere. In some designs, a backup diaphragm is provided which, in combination with the barrier diaphragm, provides a chamber to contain any fluid which may leak through the barrier diaphragm. Such chambers are sometimes provided with leak ports, so that, if the barrier diaphragm fails, the fluid which passes through the diaphragm into the chamber will be detected and appropriate action can be taken.

For example, U.S. Pat. No. 4,010,769 discloses a valve which incorporates a barrier diaphragm which contacts the fluid which flows through the valve. A second diaphragm is in the valve above the first diaphragm, and a leak port is between the diaphragms. Any fluid which may leak through the barrier diaphragm will be detected by means of the leak port and appropriate corrective action can be taken.

When a valve incorporates a diaphragm which contacts the fluid in a system, and the diaphragm is connected to the valve operating mechanism, as is the case with the valve disclosed in the '769 patent, any force which the fluid exerts on the diaphragm is transmitted to the valve operating mechanism and, thus, affects the operation of the valve. For example, in the '769 valve, a spring biases the valve closed and the valve opens by means of a solenoid. Any force exerted on the barrier diaphragm by the fluid in the system will tend to open the valve. Therefore, a larger spring is required to hold the valve closed than would be necessary if the valve was designed so that the force on the diaphragm tending to open the valve would be counterbalanced by another force in the opposite direction. The use of a larger spring results in more stresses than necessary being imparted on the valve structure, thereby tending to reduce the length of the life of the valve.

When a valve is provided with a diaphragm that is attached to the valve's operating mechanism which therefore moves with the mechanism as the valve opens and closes, the diaphragm can fail due to fatigue cracking. Usually, the greater the distance the diaphragm moves, and the more stretch and strain that is applied to the diaphragm during each cycle, the fewer cycles the diaphragm will be able to withstand before failing. Thus, it is important to minimize the length of diaphragm travel, and the strain on the diaphragm, to increase valve life.

It is therefore desirable to provide to the art a flow control valve for use with either chemically pure or corrosive liquids which uses a minimum spring force for biasing the valve and which is designed to reduce the distance the diaphragm must travel and the strain on the diaphragm so that the operation life of the valve is enhanced.

SUMMARY OF THE INVENTION

A valve assembly is provided for controlling the flow of either corrosive or chemically pure liquids without being damaged by the corrosive liquids or without contaminating the pure liquids. The design features of the valve result in minimizing the spring force required to close the valve, thereby reducing the stress on the valve components and increasing valve life. Further, because of the unique construction of the valve, there is no requirement for incorporating extra elastomeric-type O-ring seals or the like into the valve to prevent leakage from one region of the valve to another. The valve incorporates diaphragms which are attached to the valve operating mechanism and which are exposed to fluid pressure. Leak detection means are provided so that any leaks through the diaphragms can be readily detected and appropriate corrective measures or actions taken.

In one embodiment, the valve assembly provided in accordance with the present invention comprises a valve body having a top and a bottom, with a fluid inlet passage through the side of the valve body at a first location and a fluid outlet passage through the side of the valve body at a second location. This embodiment includes only a single inlet for inflow and a single outlet for outflow and is called a "two-way" valve. A second embodiment of the valve, which is described below in detail, has a single inlet and two outlets and is called a "three-way" valve.

A cap is removably mounted on the top of the valve body, and a first flexible imperforate diaphragm is mounted on the inside of the cap. A valve seat is in the valve body between the inlet and outlet passages, facing toward the valve body bottom. A second flexible imperforate diaphragm is mounted across an upper portion of the valve body above the valve seat. The second diaphragm is spaced below the first diaphragm and forms an upper barrier for fluid flowing through the valve. A space between the first and second diaphragms forms an upper chamber for containing any fluid which may leak through the second diaphragm. A base is removably mounted on the bottom of the valve body, and a third flexible imperforate diaphragm is mounted across a lower portion of the valve body below the valve seat. The third diaphragm forms a lower barrier for fluid that flows through the valve.

A poppet assembly, which is connected between the second and third diaphragms, moves with the diaphragms. The poppet assembly comprises a valve plug connected to the upwardly facing surface of the third diaphragm, configured to engage the valve seat to thereby stop the flow of fluids through the valve. A valve stem is connected at its top end to the downwardly facing surface of the second diaphragm and extends downwardly through the center portion of the valve body. The bottom end of the valve stem is removably connected to the valve plug, wherein the connection forms a fluid-tight seal between the valve stem and plug. A spring is mounted in the space between the third diaphragm and the base for biasing the poppet assembly and connected second and third diaphragms in an upwardly direction for engaging the valve plug with the valve seat to close the valve.

An annular backup ring is mounted in the upper fluid containment chamber. The backup ring has a channel through it from its inside peripheral surface to its outside peripheral surface for passage of any fluids which may leak into the chamber through the second diaphragm. A leak detection passage extends from the region of the upper containment chamber surrounding the outside peripheral surface of the backup ring through the valve body to the exterior surface of the valve body for the passage of fluids which may leak through the second diaphragm into the upper containment chamber. Such leakage of fluids is thereby detected so that appropriate action can be taken.

In a second embodiment of the present invention, the valve assembly is a three-way valve comprising a valve body having a top and a bottom, with a fluid inlet passage through the side of the valve body at a first location, a first fluid outlet passage through the side of the valve body at a second location, and a second fluid outlet passage through the side of the valve body at a third location. The first, second and third locations are spaced apart radially from each other around the body of the valve.

An upper valve seat facing toward the valve body top is located in the valve body between the inlet passage and the first outlet passage. A lower valve seat facing toward the valve body bottom is located in the valve body between the inlet passage and the second outlet passage.

A cap is removably mounted on the top of the valve body, and a first flexible imperforate diaphragm is mounted on the inside of the cap. A second flexible imperforate diaphragm is mounted across the upper portion of the valve body above the upwardly facing valve seat. The second diaphragm is spaced below the first diaphragm and forms an upper barrier for fluid flowing through the valve. The space between the first and second diaphragms forms an upper fluid containment chamber. A base is removably mounted on the bottom of the valve body. A third flexible imperforate diaphragm is mounted across a lower portion of the valve body below the downwardly facing valve seat. The third diaphragm forms a lower barrier for fluid flowing through the valve.

A poppet assembly is connected between the second and third diaphragms and moves with the diaphragms. The poppet assembly comprises a lower valve plug connected to the upwardly facing surface of the third diaphragm, and an upper valve plug connected to the downwardly facing surface of the second diaphragm. The lower valve plug is configured for engaging the downwardly facing valve seat to stop the flow of fluids from the inlet through the second outlet passage. The upper valve plug is configured for engaging the upwardly facing valve seat to stop the flow of fluids from the inlet through the first outlet passage.

A valve stem, which has one end integrally formed with one of the upper or lower valve plugs, extends through the center portion of the valve body, with the other end of the valve stem removably connected to the other valve plug. The connection between the valve stem and the valve plug forms a fluid-tight seal between the valve stem and the plug.

A spring is in the space between the third diaphragm and the base for biasing the poppet assembly and the connected second and third diaphragms in an upwardly direction for engaging the lower valve plug with the downwardly facing valve seat to stop the flow of fluids from the inlet through the second outlet passage, while, at the same time, disengaging the upper valve plug from the upwardly facing valve seat to allow flow of fluids from the inlet through the first outlet passage. Means are provided to counteract the spring force for moving the poppet assembly and the connected second and third diaphragms in a downwardly direction for engaging the upper valve plug with the upwardly facing valve seat to stop the flow of fluids from the inlet through the first outlet passage.

An annular backup ring is mounted in the upper fluid containment chamber. The backup ring has a channel through it from its inside peripheral surface to its outside peripheral surface for passage of any fluids which may leak into the chamber through the second diaphragm. A leak detection passage extends from the region of the upper containment chamber surrounding the outside peripheral surface of the backup ring through the valve body to its exterior surface of the valve body for the passage of fluids which may leak through the second diaphragm into the upper containment chamber.

BRIEF DESCRIPTION OF THE DRAWINGS

These and other features, aspects, and advantages of the present invention will be more fully understood when considered with respect to the following detailed description, appended claims, and accompanying drawings, wherein:

DETAILED DESCRIPTION

Figure 1:
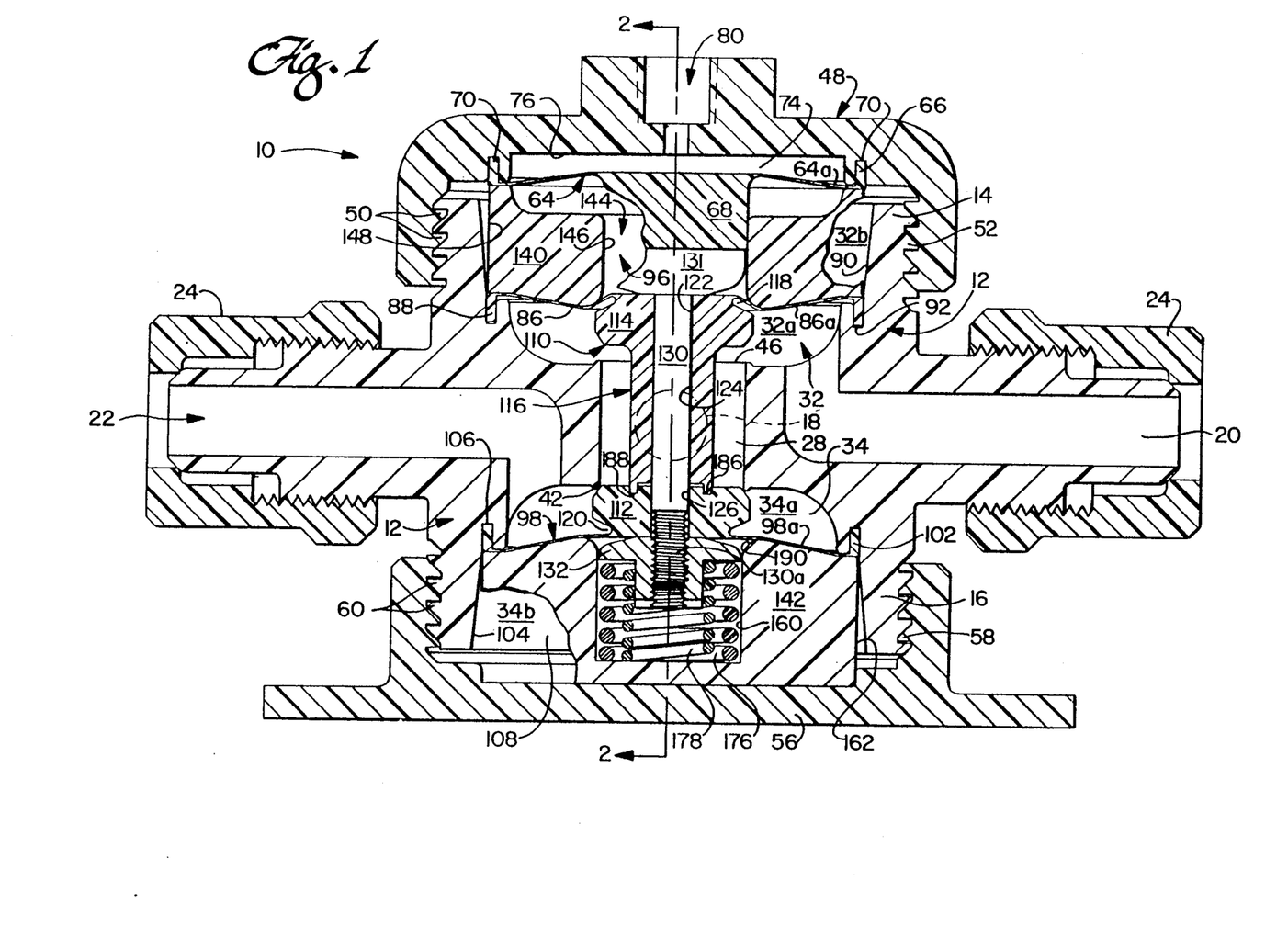
FIG. 1 is a semi-schematic, cross-sectional side view of one embodiment of the valve assembly provided in accordance with practice of the present invention in a first operating condition for controlling the flow of corrosive or chemically pure liquids.
Figure 2:
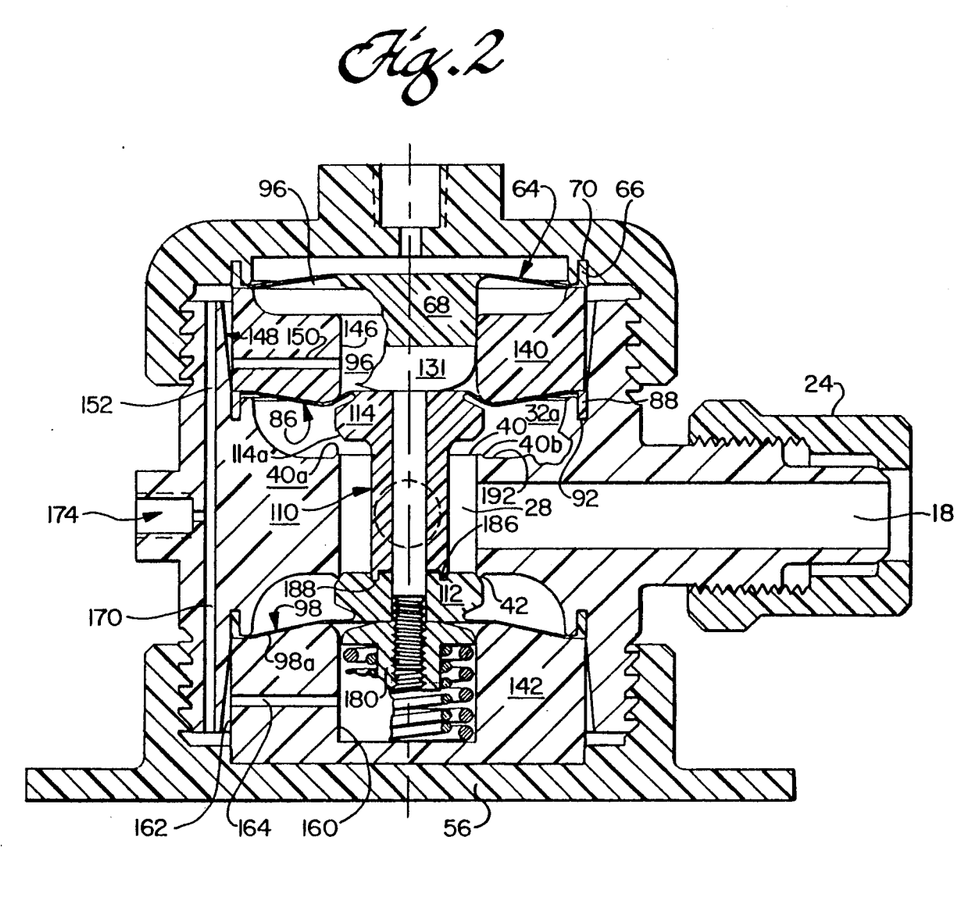
FIG. 2 is a semi-schematic, cross-sectional side view of the valve assembly of the present invention taken along line 2—2 of FIG. 1.

Referring to FIGS. 1 and 2, there are shown semi-schematic, cross-sectional side views of a preferred embodiment of a valve assembly 10 provided in accordance with practice of the present invention. (The positioning and orientation of the components of the valve assembly 10 relative to each other is described below as they are shown in the drawings.) The valve assembly includes a valve body 12 which is generally cylindrical in shape, and which has a top end portion 14 and a bottom end portion 16. As is best seen in FIG. 2 (and in phantom lines in FIG. 1), a fluid inlet passage 18 is through the side of the valve body 12 at a first location. Returning to FIG. 1, a first fluid outlet passage 20 is through the side of the valve body at a second location, and a second fluid outlet passage 22 is through the side of the valve body at a third location. The inlet 18 and the first and second outlets 20 and 22 are spaced radially apart from each other around the periphery of the valve body and enter the valve body at about the center of its height. In the illustrated embodiment, the first and second outlets are on opposite sides of the valve body, and the inlet is between the two outlets spaced equally from both. Other spacings and positions of the inlets and outlets can be used, if desired. Fittings 24 are provided on the inlet and first and second outlets for connection of piping or tubing for carrying liquids to and away from the valve.

The inlet passage 18 empties into a vertically extending cylindrical chamber 28 located in a central region of the valve body. An upwardly facing, generally cup-shaped upper chamber 32 is located above the cylindrical chamber 28, and a downwardly extending, generally cup-shaped lower chamber 34 is below the cylindrical chamber. The upwardly and downwardly facing chambers 32 and 34 are essentially identical and have proximal regions 32a and 34a nearest the center chamber and remote regions 32b and 34b distal the center chamber.

An upwardly facing valve seat 40 is in the valve body 12 at the top of the cylindrical chamber 28 and between the inlet passage 18 and the first outlet passage 20. A downwardly facing valve seat 42 is in the valve body 12 at the bottom of the cylindrical chamber 28 and between the inlet passage 18 and the second outlet passage 22.

A cap 48 is removably mounted on the top of the valve body 12 by means of internal threads 50 which mate with threads 52 on the outside surface of the valve body. A base 56 is similarly removably mounted on the bottom of the valve body by means of internal threads 58 which mate with threads 60 on the outside surface of the valve body.

The valve body 12, cap 48, and base 56 are preferably molded of an inert material, such as Teflon® PFA or Teflon® FEP, which are provided by DuPont Company of Wilmington, Del. Such materials are not damaged by corrosive, acidic, or caustic liquids and do not introduce contamination into chemically pure liquids. If desired, the valve body, cap, and base may be made from other materials, such as metals or various polymers, and the surfaces that contact liquids flowing through the valve are coated with an inert material, such as a fluoropolymer.

The unique operating mechanism incorporated in the valve assembly 10 includes a first flexible, imperforate circular diaphragm 64 mounted on the inside of the cap. The first diaphragm incorporates an upwardly extending flange 66 around its outer peripheral edge and a cylindrical plug 68 which extends downwardly from its center. An annular groove 70 is around the inside bottom surface 76 of the cap and the diaphragm is mounted on the cap by means of the diaphragm flange 66 being press fit into the cap groove 70. A space 74 is defined between the upper surface 64a of the diaphragm 64 and the inner surface 76 of the cap for accommodating an actuating fluid, i.e., a pneumatic or hydraulic fluid or the like, which operates on the diaphragm. A port 80 is through the center of the cap 48 into the space 74 to allow entry and egress of the actuating fluid.

A second flexible, imperforate circular diaphragm 86 is mounted across an upper portion of the valve body above the upwardly facing valve seat 40. The second diaphragm 86 incorporates a downwardly extending flange 88 around its peripheral edge. The inside surface of the distal region 32b of the upwardly facing valve body chamber 32 has an outward taper 90, i.e., the inside diameter of the distal region 32b of the valve body becomes larger as you move toward the top of the valve. An upwardly facing annular groove 92 is in the valve body around the base of the taper 90. The second diaphragm 86 is mounted in the valve body by means of the downwardly extending second diaphragm flange 88 being press fit in the upwardly facing annular groove 92. The second diaphragm is spaced below the first diaphragm and forms an upper barrier for fluid which flows through the valve. The space 96 between the first and second diaphragms forms an upper chamber for containing fluid which may leak from the system through the second diaphragm.

A third flexible, imperforate circular diaphragm 98 is mounted across a lower portion of the valve body below the downwardly facing valve seat 42. The third diaphragm incorporates an upwardly extending flange 102 around its peripheral edge. The inside surface of the distal region 34b of the downwardly facing valve body chamber 34 incorporates an outward taper 104, i.e., the inside diameter of the distal region 34b valve body becomes larger as you move toward the bottom of the valve. A downwardly facing annular groove 106 is around the base of the taper 104.

The third diaphragm is mounted in the valve body by means of the upwardly extending third diaphragm flange 102 being press fit in the downwardly facing annular groove 106. The third diaphragm 98 forms a lower barrier for fluid flowing through the valve, and the space 108 between the third diaphragm and the inner surface of the base forms a lower chamber for containing fluid which may leak from the system through the third diaphragm.

A poppet assembly 110 is connected to the second and third diaphragms 86 and 98, respectively, and moves with the diaphragms. The poppet assembly 110 comprises a lower valve plug 112, an upper valve plug 114, and a stem 116 connecting the valve plugs together. The lower valve plug 112 is connected to the upwardly facing surface 98a of the third diaphragm and is configured to engage the downwardly facing valve seat 42, to thereby stop the flow of fluids from the inlet 18 through the second outlet passage 22. The upper valve plug 114 is connected to the downwardly facing surface 86a of the second diaphragm 86 and is configured to engage the upwardly facing valve seat 40, to thereby stop the flow of fluids from the inlet 18 through the first outlet passage 20. In a preferred embodiment, annular grooves 118 and 120 are around the base of the valve plugs 114 and 112, respectively, between the plugs and the associated diaphragms.

The valve stem 116, which has one end integrally formed with one of the upper or lower valve plugs, extends through the center portion of the valve body, i.e., through the cylindrical chamber 28. The other end of the valve stem is removably connected to the other valve plug, wherein the connection forms a fluid-tight seal between the valve stem and the plug. In the illustrated embodiment, the valve stem 116 has its upper end integrally formed with the upper valve plug 114, and the lower end of the valve stem is removably connected to the lower valve plug 112.

The first, second, and third diaphragms are preferably formed of an inert materials, such as Teflon ® PFA or Teflon ® FEP. The diaphragms and their associated components, for example, the upper diaphragm and associated valve plug and stem, and the lower diaphragm and associated valve plug, can be fabricated by machining, if desired. Other operations such as molding can also be used.

Vertically extending bores 122, 124, and 126, which are in registry with each other, are respectively through the center of the upper valve plug 114 along the center of the length of the valve stem 116 and through the center of the lower valve plug 112. A bolt 130 extends through the stem and valve plug bores, with the head 131 of the bolt having a flat top surface which engages the flat bottom surface of the plug 68 on the first diaphragm 64. The threaded end 130a of the bolt extends from the lower valve plug bore 126. A nut 132 is tightened onto the bolt threads to firmly hold the stem and valve plugs together.

Annular backup rings 140 and 142 are mounted in the upper and lower fluid containment chambers. The upper chamber backup ring 140 has a vertical hole or bore 144 through its center defining an inner peripheral surface 146 and a generally vertically extending cylindrical outer surface 148. As is best seen in FIG. 2, a horizontal passage or bore 150 is through the upper backup ring 140 from its inside peripheral surface 146 to its cylindrical outside surface 148 for passage of any fluids which may leak into the chamber through the second diaphragm 86. The outer peripheral portion of the backup ring 140 extends between the flanges 66 and 88 of the first and second diaphragms for securely holding the first diaphragm flange 66 in the cap groove 70 and the second diaphragm flange 88 in the body groove 92, respectively.

As is shown in FIG. 2, a generally vertical leak detection passage or bore 152 extends from the region of the upper containment chamber 96 surrounding the cylindrical outside surface 148 of the backup ring through the valve body to the exterior surface of the valve body for the passage of fluids which may leak through the second diaphragm and into the upper containment chamber.

The lower containment chamber backup ring 142 has a vertically extending cylindrical bore 160 through its top surface along a portion of the center of its height. The outer surface 162 of the backup ring 142 is generally cylindrical. As is shown in FIG. 2, a horizontal passage or bore 164 is through the lower backup ring from its bore 160 to its cylindrical outside surface 162 for passage of any fluids which may leak into the lower containment chamber through the third diaphragm.

A generally vertical leak detection passage or bore 170 extends from the region of the lower containment chamber surrounding the cylindrical outside surface 162 of the backup ring 142 vertically through the valve body to the exterior surface of the valve body for the passage of fluids which may leak through the third diaphragm and into the lower containment chamber. In the illustrated embodiment, the leak detection passage 152, which extends from the region of the upper containment chamber, and the leak detection passage 170, which extends from the lower containment chamber, flow together and exit the valve body through the leak detection port 174.

Systems can be provided to sound an alarm or the like in the event that a leak is detected so that appropriate corrective measures can be taken. Such corrective measures can be, for example, to shut down other components of the system in which the valve is being used, or to actuate the valve to change its position, or other actions as appropriate. The corrective actions can be manual or automatic. Leak detection can be by visual means or sensors can be used. For example, an optical, resistance, ultrasonic, or capacitive-type leak detector sensor can be mounted directly in the leak detection port 174, if desired.

The upper and lower backup rings can be molded or otherwise formed, such as by machining, of inert materials, such as Teflon ® PFA or Teflon ® FEP. Other relatively inert polymeric materials, such as polypropylene, may also be used.

Spring means are mounted in the space between the third diaphragm 98 and the base 56 for biasing the poppet assembly 110 and connected second and third diaphragms in an upwardly direction for engaging the lower valve plug 112 with the downwardly facing valve seat 42 to thereby stop the flow of fluids from the inlet 18 through the second outlet passage 22 while, at the same time, disengaging the upper valve plug 114 from the upwardly facing valve seat 40 to allow for flow of fluids from the inlet 18 to the first outlet passage 20.

In a preferred embodiment, a pair of coil springs is mounted in the vertically extending lower backup ring bore 164, with a first one of the springs 176 having a diameter larger than the other spring 176 and with the small diameter spring nested within the larger diameter spring. In an exemplary embodiment, the small diameter spring is coiled in one direction and the large diameter spring is coiled in the opposite direction to eliminate interference problems. The nut 132 on the bolt 130 includes a downwardly extending cylindrical extension 180. In the illustrated embodiment, the extension 180 extends into the coil of the smaller diameter spring 176, with the springs 176 and 178 engaging the nut's annular bottom surface. The springs bias the poppet assembly 110 and connected second and third diaphragms in an upward direction for engaging the lower valve plug 112 with the downwardly facing valve seat 42.

The nut and bolt can be made of ceramic materials, inert polymeric materials, such as Teflon ® or the like, or can be made of a metal and coated with an inert material, such as Teflon ®. The small and large diameter springs are preferably metal, coated with Teflon ® or other fluoropolymer material.

Figure 3:
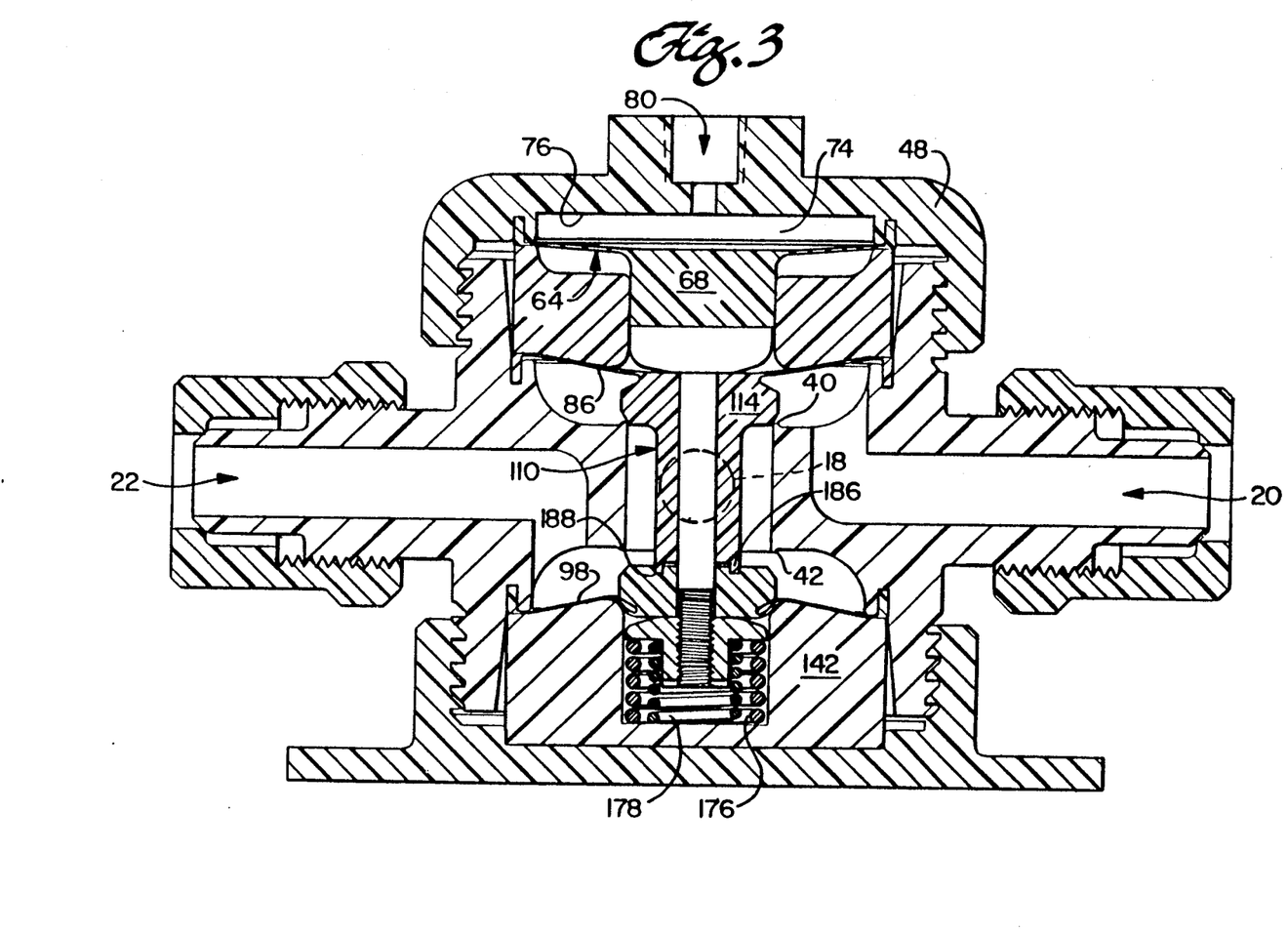
FIG. 3 is a semi-schematic, cross-sectional side view of the valve assembly shown in FIG. 1 in a second operating condition.

When it is desired to stop the flow of fluids from the inlet 18 through the first outlet passage, pneumatic pressure or hydraulic pressure or the like is introduced through the port 80 in the valve cap 48 into the space 74 between the first diaphragm 64 and the inner surface 76 of the cap. Referring to FIG. 3, upon entry of the actuating fluid into the space 74, the fluid pressure acts on the diaphragm 64 to force the diaphragm and plug 68 down, pushing the poppet assembly 110 and connected second and third diaphragms 86 and 98, respectively, in a downwardly direction against the force of the springs 176 and 178. This results in the upper valve plug 114 engaging the upwardly facing valve seat 40 to stop the flow of fluids from the inlet 18 through the first outlet passage 20, while, at the same time, the lower valve plug 112 disengages from the downwardly facing valve seat 42 to allow for flow of fluids from the inlet 18 through the second outlet passage 22.

A key feature of the design of the valve assembly 10 of the present invention is that the spring force required to move the valve plug 112 against the seat 42 to close the valve is minimized. Minimizing the spring force is accomplished, in part, by providing the lower backup ring 142, which engages a selected portion of an annular peripheral segment of the downwardly facing surface 98a of the diaphragm 98. When the lower valve plug 112 is disengaged from the seat 42, as is the case when the valve is in the condition shown in FIG. 3, the pressure of the fluid flowing through the valve from the inlet 18 through the outlet 22 acts on the diaphragm 98. However, the downward force generated by the fluid equals only the fluid pressure times the area of the diaphragm that is not in contact with the backup ring. This minimizes the downwardly directed force opposing the spring force, thereby reducing the force required to close the valve upon the release of the actuating fluid pressure in the space 74.

The provision of the backup ring 142 also minimizes the spring force required to maintain the valve plug 112 seated in the valve seat 42 against any back pressure from the outlet 22. For example, when the valve assembly 10 is in the condition shown in FIG. 1, back pressure from the outlet 22 acts on the diaphragm 98, tending to disengage the valve plug 112 from the valve seat, which would result in leakage. However, as was described above with regard to the minimized spring force for closing the valve plug against the seat 42, the downward force generated by the fluid equals only the outlet line back pressure times the area of the diaphragm that is not in contact with the backup ring 142. This minimizes the downwardly directed force which operates against the spring force and results in minimizing the size of the spring required to maintain the valve plug 112 seated against back pressure.

Another key feature of the valve assembly of the present invention is that the height of the valve taken up by the spring is minimized while optimizing the uniformity of the spring force. This advantage is accomplished by providing the two nested springs instead of a single spring. If a single spring, having the same spring force as the combined force of the nested springs and having the same height as the nested springs, was used, the single spring would not provide as constant a spring force in the operating range as is provided by the nested springs. In order to obtain the same constancy of spring force with a single spring that is provided by the nested springs, the height of the single spring would have to be substantially more than the height of the nested springs. This would require that the valve be larger, which is a disadvantage.

Another key feature of the valve assembly 10 of the present invention is the provision of diaphragms which, instead of being stretched tight when mounted in the valve in a horizontal plane, have a pre-designed amount of slack in their surface. In one exemplary embodiment, the diameter of the second and third diaphragms, when stretched tight, is 1.965 inches. The tapers 90 and 104 of the outer walls of the upper and lower valve chambers 32 and 34, respectively, are approximately 4°. In this embodiment, the diameter of the upper and lower chambers 32 and 34, respectively, at their top- and bottom-most elevations, i.e., at their openings, is 2.030 inches, while the diameters of the upper and lower chamber grooves 92 and 106 in which the diaphragm flanges 88 and 102 are seated are only 1.955 inches.

Having the openings of the valve chambers larger in diameter than the diameter of the diaphragms provides for ease of mounting the diaphragms in the chamber grooves while, in so doing, the diaphragms are compressed radially inwardly so that their surfaces are slack. Mounting the diaphragms is accomplished by sliding each diaphragm along its respective tapered chamber wall while compressing the diaphragm radially inwardly until the diaphragm flange is securely mounted in the associated groove. Because the diaphragm surfaces are not tight, movement of the diaphragms, either upwardly or downwardly, is accommodated, at least in part, by the slack, in the diaphragm surface. This reduces the stress on the diaphragm as it cycles with the poppet assembly, thereby increasing diaphragm life.

Another feature of the present invention which further reduces the stress on the diaphragms as the valve cycles is the provision of the V-shaped grooves 118 and 120 around the base of each valve plug between the plug and the diaphragm. In an exemplary embodiment, a diaphragm is provided which has a thickness of approximately 0.013 inch and a pre-installed diameter of 1.965 inches. The diameter of the valve plug at the center of its height is 0.810 inch, while the plug diameter at the point of connection to the diaphragm is 0.600 inch. The grooves are approximately V-shaped (when the diaphragm is in a horizontal plane), and the angle of the V is approximately 27°, while the apex of the V is defined by a circular radius of 0.020 inch. As can be seen by referring to FIGS. 1 and 3, instead of stretching the diaphragm when the poppet is moved, the diaphragm material which forms the base of the V simply collapses toward or opens away from the base of the valve plug. This action reduces the stretching or stress on the diaphragm during its cycling, thereby increasing the number of cycles that the valve can undergo without diaphragm failure.

The simplicity of construction of the valve of the present invention makes it easy to change the pressure of the actuating fluid that is required to operate the valve and to change the back pressure which can be withstood without resulting in inadvertent valve opening or leakage. For example, the area of the surface of the backup ring that is in contact with the diaphragm can simply be changed to allow more or less force to be generated by the system fluids in a downward direction against spring force or in an upward direction with spring force. Referring, for example, to FIG. 1, one simple design change which results in changing the forces exerted on the diaphragm can be to change the radius of curvature of the lip 190 of the backup ring 142, the lip 190 being that portion of the backup ring surface that is not in contact with the diaphragm and transitions to the vertically extending inner peripheral surface of the vertical bore 160. For example, all other things being constant, when the valve assembly 10 is in the condition shown in FIG. 1, having a larger radius of curvature of the backup ring lip 190 results in a larger downwardly directed force generated by the back pressure from the outlet 22 than would be generated if the lip is of a smaller radius. This is so because, with the larger radius, less diaphragm surface area would be contacted by the backup ring compared to the diaphragm surface area contacted with a smaller radius lip. Referring to FIG. 1, if the radius of the backup ring lip 190 were made smaller, a higher back pressure could be withstood by the springs while maintaining the valve plug 112 on the valve seat 42. Conversely, if the radius of curvature were made larger, less back pressure could be withstood. In an exemplary embodiment of the valve assembly 10 of the present invention, the radius of curvature of the lower backup ring 142 is 0.093 inch, with the angle of the backup ring surface contacting the diaphragm surface being 12° from horizontal.

Yet another key feature of the valve assembly 10 provided in accordance with the present invention is that the valve can be completely disassembled, yet no added O-ring seals or the like are required to preclude leakage of fluid from the system into the lower containment chamber 108 along the bolt 130. The capability to disassemble the valve while eliminating the requirement for extra seals is the result of providing that the connection between the valve stem 116 and plug 112 which provides the fluid-tight seal is not permanent. Instead, the connection can be repeatedly made and then broken as the valve is assembled and disassembled. As can be understood by referring to FIG. 1, the connection between the valve stem 116 and valve plug 112 is made in a tongue-and-groove-type arrangement, wherein an annular flange 186 around the outside periphery of the bottom end of the stem 116 is press fit into an annular groove 188 around the top surface of the valve plug 112. In a preferred embodiment, the height of the flange is greater than the depth of the groove so that, when the valve stem and valve plug are compressed together by tightening the nut 132 on the bolt 130, the flange material deforms outwardly, creating a pressure fit within the groove 188. In one exemplary embodiment, the flange height is 0.055 inch, and the flange width is 0.043 inch, while the groove is 0.040 inch deep and 0.039 inch wide.

In another preferred embodiment of the valve assembly 10 of the present invention, the bottom end of the stem can be threaded into a threaded groove in the top surface of the valve plug to provide the non-permanent fluid-tight seal.

Yet another key feature of the valve assembly 10 of the present invention is the unique design of the valve seats 40 and 42 which facilitates the tight seal made between the seat and valve plug when the two are engaged. Since the seats 40 and 42 are constructed identically, only one will be described below. As can be seen by referring to FIG. 2 for example, the valve seat 40 extends around the opening of the top of the cylindrical chamber 28 in the form of a ridge or lip. The dimensions of the ridge are such that it flexes outwardly when engaged with the beveled edge 114a of the valve plug 114. Such outward flexing enables the seat to conform to a larger surface area of the valve plug to thereby form a better seal and to conform to any discontinuities or rough spots on the valve plug, to thereby enhance the seal.

In an exemplary embodiment, the valve body 12, including the valve seat 40, is machined of polytetrafluoroethylene (PTFE). The seat extends approximately 0.020 inch above the surface 192 of the upper chamber proximal region 32a and has a flat horizontal upper surface 40a which is 0.020 inch wide. In the illustrated embodiment, the outer surface 40b of the seat is sloped at a 45° angle outwardly from its top, which adjoins the flat surface 40a, to its bottom adjoining the surface 192. In another embodiment, where the valve body 12 is molded of Teflon ® PFA, the dimensions of the valve seat are the same as is described above for the valve body of PTFE, except that the outer surface is not sloped but extends vertically from the surface 40a to the surface 192. The machined PTFE is more flexible, i.e., softer, than molded PFA, and the 45° angle on the surface of the machined part is desirable to provide additional support to the sealing lip when it is engaged to the valve plug.

Figure 4:
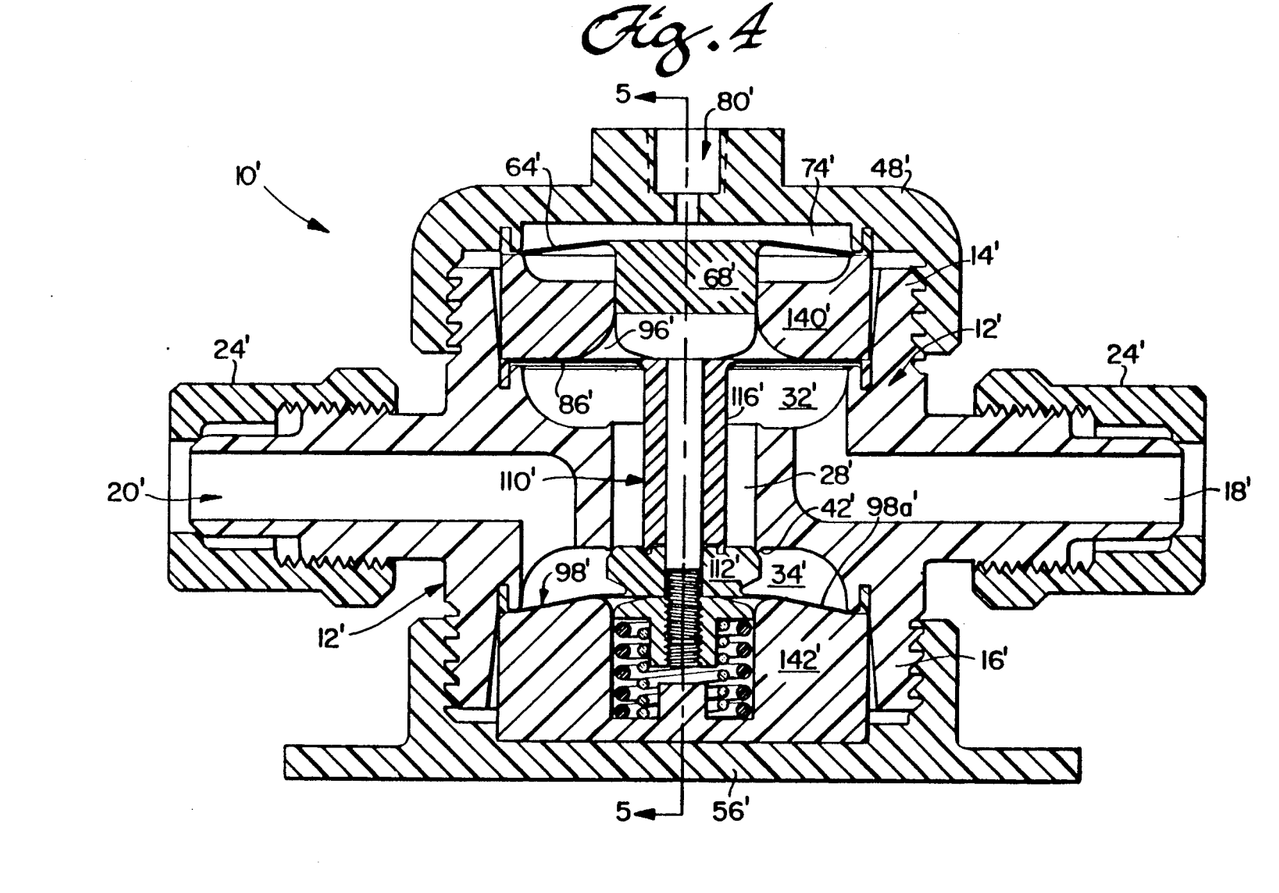
FIG. 4 is a semi-schematic, cross-sectional side view of a second embodiment of the valve assembly provided in accordance with practice of the present invention shown in its normally closed condition.
Figure 5:
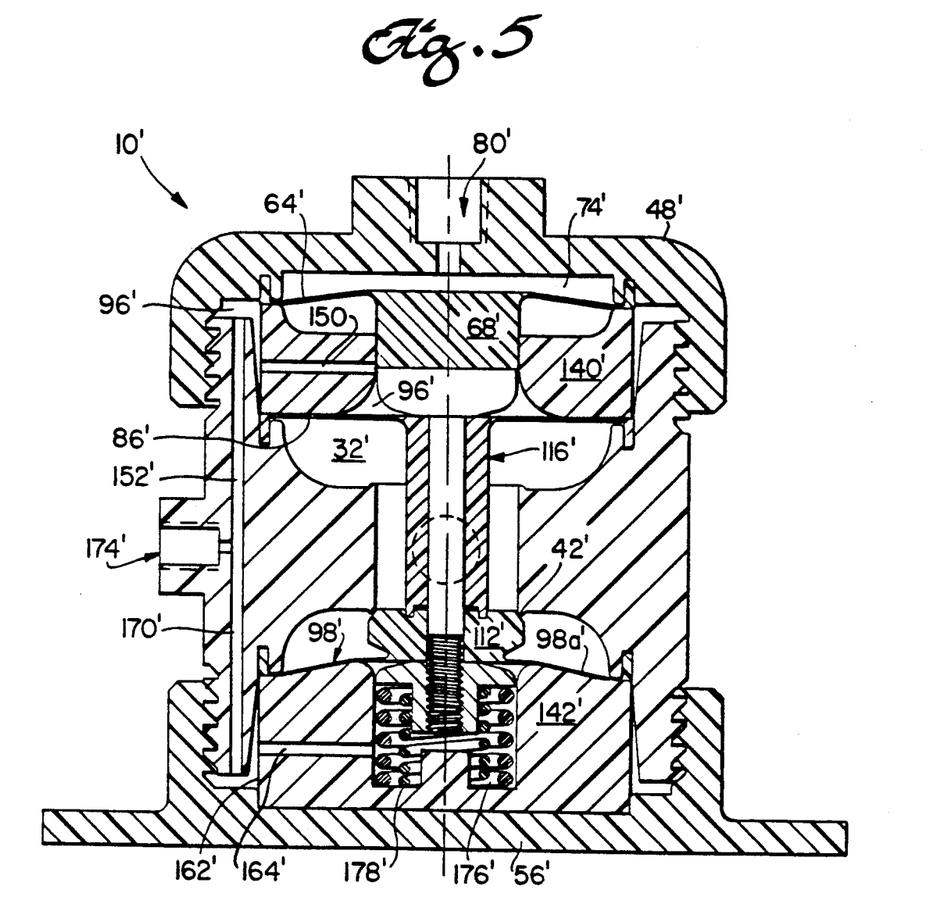
FIG. 5 is a semi-schematic, cross-sectional side view of the valve assembly of the present invention taken along line 5—5 of FIG. 4.

Referring to FIGS. 4 and 5, there are shown semi-schematic, cross-sectional side views of a second preferred embodiment of a valve assembly provided in accordance with practice of the present invention. The components of the valve assembly shown in FIGS. 4 and 5, which are similar to the components identified with reference to FIGS. 1–3, have the same reference numerals but with a prime (') designation. The valve assembly 10' of this embodiment incorporates essentially the same components as the components of the embodiments shown in FIGS. 1–3, except the embodiment of FIGS. 4 and 5 is a two-way valve with a single inlet and outlet, and only a single valve plug is provided.

The valve assembly 10' includes a valve body 12' which has a top end portion 14' and a bottom end portion 16'. A fluid inlet passage 18' is through the side of the valve body 12' at a first location. A fluid outlet passage 20' is through the side of the valve body at a second location which is spaced apart radially from the first location. In the illustrated embodiment, the inlet and outlet are on opposite sides of the valve body. Fittings 24' are provided on the inlet and outlet for connection of piping or tubing for carrying liquids to and away from the valve.

The inlet passage 18' empties into a vertically extending cylindrical chamber 28' located in a central region of the valve body. An upwardly facing, generally cup-shaped upper chamber 32' is located above the cylindrical chamber 28', and a downwardly extending, generally cup-shaped lower chamber 34' is below the cylindrical chamber.

A downwardly facing valve seat 42' is in the valve body 12' at the bottom of the cylindrical chamber 28' and between the inlet passage 18' and the outlet passage 20'.

A cap 48' is removably mounted on the top of the valve body 12', and a base 56' is similarly removably mounted on the bottom of the valve body. The operating mechanism of the valve assembly 10' includes a first flexible, imperforate circular diaphragm 64' which is mounted on the inside of the cap 48' in a similar manner as the mounting of the diaphragm to the cap as shown in FIGS. 1–3. A port 80' is through the center of the cap 48' to allow entry and egress of an actuating fluid into the space 74' between the cap and the diaphragm.

A second flexible, imperforate circular diaphragm 86' is mounted across an upper portion of the valve body. The second diaphragm is mounted in the valve body similarly to the mounting of the second diaphragm to the valve body as shown in FIGS. 1-3. A third flexible, imperforate circular diaphragm 98' is mounted across a lower portion of the valve body below the downwardly facing valve seat 42'. The third diaphragm is mounted in the valve body in a similar manner as the third diaphragm was mounted in the valve body shown in FIGS. 1-3.

The poppet assembly 110' is similar to the poppet assembly of FIGS. 1-3, with the exception that no upper valve plug is provided but, instead, the stem 116' is connected directly to the downwardly facing surface of the second diaphragm. A lower valve plug 112' is connected to the upwardly facing surface 98a' of the third diaphragm and is configured to engage the downwardly facing valve seat 42' to thereby stop the flow of fluids from the inlet 18' through the outlet passage 20'.

Annular backup rings 140' and 142' are mounted in the upper and lower fluid containment chambers, respectively. As is shown in FIG. 5, a bore 150' extends horizontally through the upper backup ring 140', and a generally vertical leak detection passage or bore 152' extends from the region of the upper containment chamber 96' surrounding the backup ring through the valve body to the exterior surface of the valve body for the passage of fluids which may leak through the second diaphragm and into the upper containment chamber.

The annular backup ring 142' in the lower containment chamber incorporates a horizontal passage or bore 164' for passage of any fluids which may leak into the lower containment chamber through the third diaphragm 98'. A generally vertical leak detection passage or bore 170' extends from the region of the lower containment chamber surrounding the cylindrical outside surface 162' of the backup ring 142' vertically through the valve body to the exterior surface of the valve body for the passage of fluids which may leak through the third diaphragm and into the lower containment chamber. In the illustrated embodiment, the leak detection passage 152' extending from the region of the upper containment chamber and the leak detection passage 170' extending from the lower containment chamber flow together and exit the valve body through the leak detection port 174'.

In FIGS. 4 and 5, the valve is shown in a condition with the springs 176' and 178' biasing the valve plug 112' against the seat 42', to thereby stop the flow of fluids from the inlet 18' to the outlet 20'.

Figure 6:
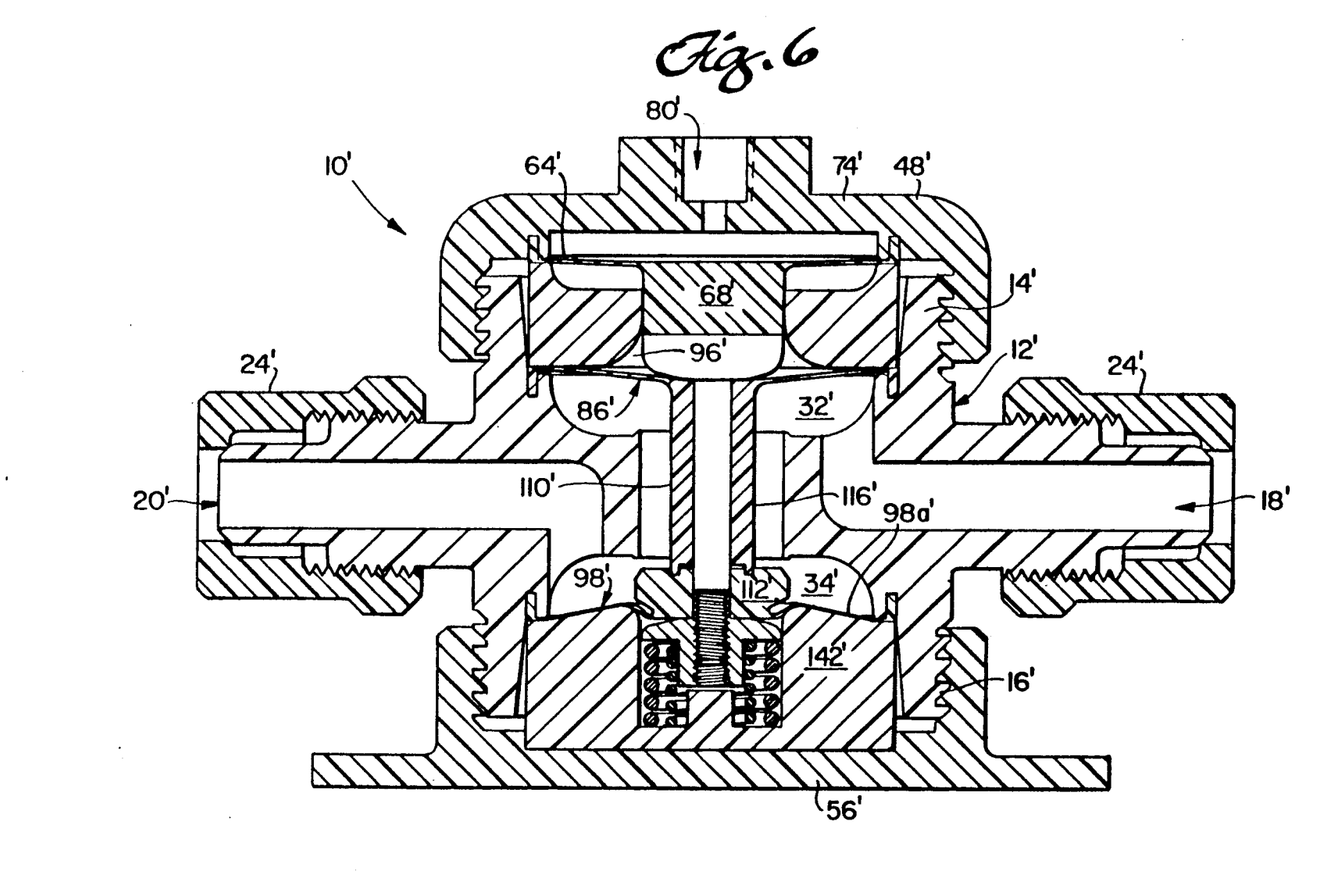
FIG. 6 is a semi-schematic, cross-sectional side view of the valve assembly shown in FIG. 4 in its normally open condition.

As can be seen to referring to FIG. 6, upon entry of the actuating fluid into the space 74', the fluid pressure acts on the diaphragm 64' to force the diaphragm 64' and associated plug 68' down, pushing the poppet assembly 110' and the connected second and third diaphragms in a downwardly direction against the force of the springs 176' and 178'. This results in the valve plug disengaging the downwardly facing valve seat to allow the flow of fluids from the inlet 18' through the outlet passage 20'.

Figure 7:
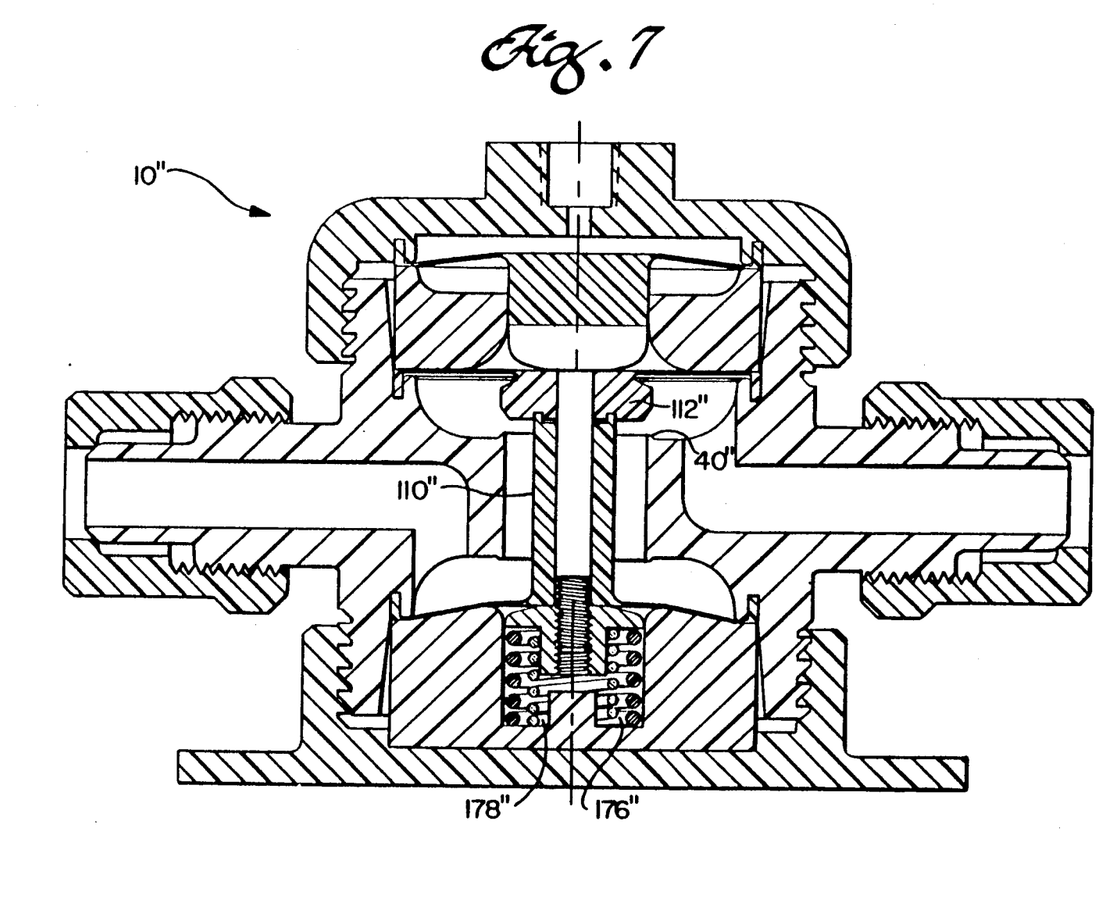
FIG. 7 is a semi-schematic, cross-sectional side view of another embodiment of the valve assembly provided in accordance with practice of the present invention shown in its normally open condition.

Referring to FIG. 7, yet another preferred embodiment of the valve assembly of the present invention is shown. Parts of the device of FIG. 7 which are similar to parts identified with reference to FIGS. 1-6 have the same reference numerals, with a double prime (") designation. The FIG. 7 embodiment is the same as the FIGS. 4-6 embodiment, with the exception that the poppet assembly 110" is reversed, i.e., the valve assembly 10" is in a normally open condition, wherein the valve plug 112" is biased away from the valve seat 40" by the springs 176" and 178".

The above description of preferred embodiments of the diaphragm valve of the present invention are for illustrative purposes. For example, the "three-way" valve described with reference to FIGS. 1-3 could use the port 18 as an outlet with the ports 20 and 22 functioning as inlets for two separate fluids. Because of variations which will be apparent to those skilled in the art, the present invention is not intended to be limited to the particular embodiments described above. The scope of the invention is defined in the following claims.

What is claimed is:

1. A valve assembly comprising:
   (a) a valve body having a top and a bottom, with a fluid inlet passage through the side of the valve body at a first location and a fluid outlet passage through the side of the valve body at a second location;
   (b) a valve seat in the valve body facing toward the valve body bottom and located between the inlet and outlet passages;
   (c) a cap removably mounted on the top of the valve body;
   (d) a first flexible imperforate diaphragm mounted on the inside of the cap;
   (e) a second flexible imperforate diaphragm mounted across an upper portion of the valve body above the valve seat, the second diaphragm spaced below the first diaphragm and forming an upper barrier for fluid flowing through the valve, wherein the space between the first and second diaphragms forms an upper fluid containment chamber;
   (f) a base removably mounted on the bottom of the valve body;
   (g) a third flexible imperforate diaphragm mounted across a lower portion of the valve body below the valve seat, the third diaphragm spaced below the second diaphragm and forming a lower barrier for fluid flowing through the valve;
   (h) a poppet assembly connected between the second and third diaphragms which moves with the diaphragms, the poppet assembly comprising:
      (1) a valve plug connected to the upwardly facing surface of the third diaphragm, the valve plug configured for engaging the valve seat to thereby stop the flow of fluids through the valve; and
      (2) a valve stem connected at its top end to the downwardly facing surface of the second diaphragm and extending downwardly through a center portion of the valve body, the bottom end of the valve stem removably connected to the valve plug, wherein the connection forms a fluid-tight seal between the valve stem and the plug;
   (i) spring means mounted in a space between the third diaphragm and the base for biasing the poppet assembly and connected second and third diaphragms in an upwardly direction for engaging the valve plug with the valve seat to thereby close the valve;
   (j) an annular backup ring mounted in the upper fluid containment chamber, the ring having a channel through it from its inside peripheral surface to its outside peripheral surface for passage of any fluids which may leak into the chamber through the second diaphragm; and (k) a leak detection passage extending from the region of the upper containment chamber surrounding the outside peripheral surface of the backup ring through the valve body to the exterior surface of said valve body for the passage of fluids which may leak through the second diaphragm into the upper containment chamber.

2. A valve assembly as claimed in claim 1, wherein the cap has a port through its center for entry of a fluid for actuating the valve.

3. A valve assembly as claimed in claim 1, wherein the first, second and third diaphragms are circular in construction and are in registration with each other, one above the other.

4. A valve assembly as claimed in claim 1, wherein the space formed between the third diaphragm and the base defines a lower fluid containment chamber.

5. A valve assembly as claimed in claim 4, wherein the valve additionally comprises a leak detection passage extending from the lower containment chamber through the valve body to its exterior surface for the passage of fluids which may leak through the third diaphragm into the lower containment chamber.

6. A valve assembly as claimed in claim 1, wherein the upper containment chamber backup ring comprises an outer peripheral portion extending between the first and second diaphragms, wherein the bottom surface of the ring contacts an annular segment of the upwardly facing surface of the second diaphragm, said annular segment extending from the outer peripheral edge of the second diaphragm radially inwardly a selected distance.

7. A valve assembly as claimed in claim 6, wherein the portion of the ring's bottom surface which is in contact with the annular segment of the second diaphragm when the valve is closed is in a horizontal plane.

8. A valve assembly as claimed in claim 1, wherein the valve stem has a bore along the center of its length which is in registry with a bore through the center of the valve plug, an elongated bolt extends through the stem and valve plug bores with the threaded end of the bolt extending from the valve plug bore, a nut is on the bolt threads to firmly hold the stem and valve plug together, and the nut includes a downwardly extending cylindrical extension.

9. A valve assembly as claimed in claim 8, wherein the spring means in the lower containment chamber comprises a pair of coil springs, one of the springs having a larger diameter than the other, with the smaller diameter spring nested within the larger diameter spring, wherein the downwardly extending cylindrical extension on the nut extends into the smaller diameter coil.

10. A valve assembly as claimed in claim 1, wherein the inside surfaces of the top and bottom portions of the valve body are tapered outwardly, an upwardly facing annular groove is around the base of the taper in the top portion of the valve body and a downwardly facing annular groove is around the base of the taper in the bottom portion of the valve body, wherein the second and third diaphragms have flanges extending axially from their peripheral edges, the flange of the second diaphragm being mounted in the upwardly facing annular groove and the flange of the third diaphragm being mounted in the downwardly facing annular groove, wherein the diameter of the first and second diaphragms is a selected amount greater than the diameter of the annular grooves, so that when the diaphragm flanges are mounted in the annular grooves, the diaphragm surfaces are slack.

11. A valve assembly as claimed in claim 1, wherein the surface area of the second diaphragm exposed to the pressure of fluid flowing through the valve is substantially the same as the surface area of the third diaphragm which is exposed to such fluid pressure, wherein the resulting upward force on the second diaphragm provided by such fluid is balanced by the downward force provided by the fluid on the third diaphragm.

12. A valve assembly as claimed in claim 1, wherein the valve plug is integrally formed with the third diaphragm and an annular V-shaped groove is around the base of the valve plug between the plug and the diaphragm.

13. A valve assembly as claimed in claim 1 additionally comprising an annular backup ring mounted in a space defined between the third diaphragm and the base, the space being a lower fluid containment chamber, wherein tightening means are on the backup ring to eliminate the slack in the surface of the third diaphragm.

14. A valve assembly as claimed in claim 1 additionally comprising an annular backup ring mounted in a space defined between the third diaphragm and the base, the space being a lower fluid containment chamber, the ring having a channel through it from its inside peripheral surface to its outside peripheral surface for passage of fluids which may leak into the chamber through the third diaphragm, wherein the top surface of the ring contacts an annular segment of the downwardly facing surface of the third diaphragm, the annular segment extending from the outer peripheral edge of the third diaphragm radially inwardly a selected distance, wherein the portion of the top surface of the ring which is in contact with the annular segment when the valve is closed slopes upwardly from the periphery of the ring toward its center.

15. A valve assembly as claimed in claim 1, wherein the valve seat is in the form of a ridge having dimensions sufficient to flex outwardly when engaged to the valve plug to thereby enhance the seal between the valve plug and seat when the two are engaged.

16. A valve assembly comprising:

(a) a valve body having a top and a bottom, with a fluid inlet passage through the side of the valve body at a first location and a fluid outlet passage through the side of the valve body at a second location, the first location spaced apart radially from the second location;

(b) a valve seat in the valve body facing toward the valve body bottom and located between the inlet and outlet passages;

(c) a cap removably mounted on the top of the valve body, the cap having a port through its center for entry of a fluid for actuating the valve;

(d) a first flexible imperforate diaphragm mounted on the inside of the cap, wherein a space is defined between the upper surface of the diaphragm and the inner surface of the cap, the actuating fluid port opening into said space;

(e) a second flexible imperforate diaphragm mounted across an upper portion of the valve body above the valve seat, the second diaphragm forming an upper barrier for fluid flowing through the valve and being in registration with the first diaphragm, wherein the space between the first and second diaphragms forms an upper fluid containment chamber;

(f) a base removably mounted on the bottom of the valve body;

(g) a third flexible imperforate diaphragm mounted across a lower portion of the valve body below the valve seat, the third diaphragm forming a lower barrier for fluid flowing through the valve and being in registration with the first and second diaphragms, wherein the space between the third diaphragm and the base forms a lower fluid containment chamber;

(h) a poppet assembly connected between the second and third diaphragms which moves with the diaphragms, the poppet assembly comprising:

(1) a valve plug connected to the upwardly facing surface of the third diaphragm, the valve plug configured for engaging the valve seat to thereby stop the flow of fluids through the valve; and (2) a valve stem connected at its top end to the downwardly facing surface of the second diaphragm and extending downwardly through a center portion of the valve body, the bottom end of the valve stem removably connected to the valve plug, wherein the connection forms a fluid-tight seal between the valve stem and the plug;

(i) spring means in the lower containment chamber for biasing the poppet assembly and connected second and third diaphragms in an upwardly direction for engaging the valve plug with the valve seat to thereby close the valve;

(j) an annular backup ring mounted in the upper fluid containment chamber, an outer portion of the ring extending between the first and second diaphragms, the bottom surface of the ring contacting an annular segment of the upwardly facing surface of the second diaphragm, said annular segment extending from the outer peripheral edge of the second diaphragm radially inwardly a selected distance, the ring having a channel through it from its inside peripheral surface to its outside peripheral surface for passage of any fluids which may leak into the chamber through the second diaphragm;

(k) a leak detection passage extending from the region of the upper containment chamber surrounding the outside peripheral surface of the backup ring through the valve body to its exterior surface for the passage of fluids which may leak through the second diaphragm into the upper containment chamber; and (l) an annular backup ring mounted in the lower containment chamber, the ring having a channel through it from its inside peripheral surface to its outside peripheral surface for passage of fluids which may leak into the chamber through the third diaphragm, wherein the top surface of the ring contacts an annular segment of the downwardly facing surface of the third diaphragm, the annular segment extending from the outer peripheral edge of the third diaphragm radially inwardly a selected distance, wherein the portion of the top surface of the ring which is in contact with the annular segment when the valve is closed slopes upwardly from the periphery ring toward its center.

17. A valve assembly as claimed in claim 16, wherein the valve stem has a bore along the center of its length which is in registry with a bore through the center of the valve plug, an elongated bolt extends through the stem and valve plug bores with the threaded end of the bolt extending from the valve plug bore, a nut is on the bolt threads to firmly hold the stem and valve plug together, and the nut includes a downwardly extending cylindrical extension.

18. A valve assembly as claimed in claim 17, wherein the spring means in the lower containment chamber comprises a pair of coil springs, one of the springs having a larger diameter than the other, with the smaller diameter spring nested within the larger diameter spring, wherein the downwardly extending cylindrical extension on the nut extends into the smaller diameter coil.

19. A valve assembly as claimed in claim 16, wherein the inside surfaces of the top and bottom portions of the valve body are tapered outwardly, an upwardly facing annular groove is around the base of the taper in the top portion of the valve body and a downwardly facing annular groove is around the base of the taper in the bottom portion of the valve body, wherein the second and third diaphragms have flanges extending axially from their peripheral edges, the flange of the second diaphragm being mounted in the upwardly facing annular groove and the flange of the third diaphragm being mounted in the downwardly facing annular groove, wherein the diameter of the first and second diaphragms is a selected amount greater than the diameter of the annular grooves.

20. A valve assembly as claimed in claim 16, wherein the surface area of the second diaphragm exposed to the pressure of fluid flowing through the valve is substantially the same as the surface area of the third diaphragm which is exposed to such fluid pressure, wherein the resulting upward force on the second diaphragm provided by such fluid is balanced by the downward force provided by the fluid on the third diaphragm.

21. A valve assembly as claimed in claim 16, wherein the valve seat is in the form of a ridge having dimensions sufficient to flex outwardly when engaged to the valve plug to thereby enhance the seal between the valve plug and seat when the two are engaged.

22. A valve assembly comprising:

(a) a valve body having a top and a bottom, with a fluid inlet passage through the side of the valve body at a first location and a fluid outlet passage through the side of the valve body at a second location;

(b) a valve seat in the valve body facing toward the valve body top and located between the inlet and outlet passages;

(c) a cap removably mounted on the top of the valve body;

(d) a first flexible imperforate diaphragm mounted on the inside of the cap;

(e) a second flexible imperforate diaphragm mounted across an upper portion of the valve body above the valve seat, the second diaphragm spaced below the first diaphragm and forming an upper barrier for fluid flowing through the valve, wherein the space between the first and second diaphragms forms an upper fluid containment chamber;

(f) a base removably mounted on the bottom of the valve body;

(g) a third flexible imperforate diaphragm mounted across a lower portion of the valve body below the valve seat, the third diaphragm spaced below the second diaphragm and forming a lower barrier for fluid flowing through the valve;

(h) a poppet assembly connected between the second and third diaphragms which moves with the diaphragms, the poppet assembly comprising:

(1) a valve plug connected to the downwardly facing surface of the second diaphragm, the valve plug configured for engaging the valve seat to thereby stop the flow of fluids through the valve; and (2) a valve stem connected at its bottom end to the upwardly facing surface of the third diaphragm and extending upwardly through a center portion of the valve body, the top end of the valve stem removably connected to the valve plug, wherein the connection forms a fluid-tight seal between the valve stem and plug;

(i) spring means in a space between the third diaphragm and the base for biasing the poppet assembly and connected second and third diaphragms in an upwardly direction for disengaging the valve plug from the valve seat to thereby open the valve;

(j) an annular backup ring mounted in the upper fluid containment chamber, the ring having a channel through it from its inside peripheral surface to its outside peripheral surface for passage of any fluids which may leak into the chamber through the second diaphragm; and (k) a leak detection passage extending from the region of the upper containment chamber surrounding the outside peripheral surface of the backup ring through the valve body to the exterior surface of said valve body for the passage of fluids which may leak through the second diaphragm into the upper containment chamber.

23. A valve assembly as claimed in claim 22, wherein the cap has a port through its center for entry of a fluid for actuating the valve.

24. A valve assembly as claimed in claim 22, wherein the first, second and third diaphragms are circular in construction and are in registration with each other, one above the other.

25. A valve assembly as claimed in claim 22, wherein the space formed between the third diaphragm and the base defines a lower fluid containment chamber.

26. A valve assembly as claimed in claim 25, wherein the valve additionally comprises a leak detection passage extending from the lower containment chamber through the valve body to its exterior surface for the passage of fluids which may leak through the third diaphragm into the lower containment chamber.

27. A valve assembly as claimed in claim 22, wherein the spring means comprises a pair of coil springs, one of the springs having a larger diameter than the other, with the smaller diameter spring nested within the larger diameter spring.

28. A valve assembly as claimed in claim 22 additionally comprising an annular backup ring mounted in a space defined between the third diaphragm and the base, the space being a lower fluid containment chamber, the ring having a channel through it from its inside peripheral surface to its outside peripheral surface for passage of fluids which may leak into the chamber through the third diaphragm, wherein the top surface of the ring contacts an annular segment of the downwardly facing surface of the third diaphragm, the annular segment extending from the outer peripheral edge of the third diaphragm radially inwardly a selected distance, wherein the portion of the top surface of the ring which is in contact with the annular segment when the valve is closed slopes upwardly from the periphery of the ring toward its center.

29. A valve assembly as claimed in claim 22, wherein the valve seat is in the form of a ridge having dimensions sufficient to flex outwardly when engaged to the valve plug to thereby enhance the seal between the valve plug and seat when the two are engaged.

30. A valve assembly comprising:

(a) a valve body having a top and a bottom, with a fluid inlet passage through the side of the valve body at a first location, a first fluid outlet passage through the side of the valve body at a second location, and a second fluid outlet passage through the side of the valve body at a third location, the first, second, and third locations being spaced apart from each other;

(b) a valve seat in the valve body facing toward the valve body top located between the inlet passage and the first outlet passage;

(c) a valve seat in the valve body facing toward the valve body bottom located between the inlet passage and the second outlet passage;

(d) a cap removably mounted on the top of the valve body;

(e) a first flexible imperforate diaphragm mounted on the inside of the cap;

(f) a second flexible imperforate diaphragm mounted across an upper portion of the valve body above the upwardly facing valve seat, the second diaphragm spaced below the first diaphragm and forming an upper barrier for fluid flowing through the valve, wherein the space between the first and second diaphragms forms an upper fluid containment chamber;

(g) a base removably mounted on the bottom of the valve body;

(h) a third flexible imperforate diaphragm mounted across a lower portion of the valve body below the downwardly facing valve seat, the third diaphragm forming a lower barrier for fluid flowing through the valve;

(i) a poppet assembly connected between the second and third diaphragms which moves with the diaphragms, the poppet assembly comprising:

(1) a lower valve plug connected to the upwardly facing surface of the third diaphragm, the lower valve plug configured for engaging the downwardly facing valve seat to thereby stop the flow of fluids from the inlet through the second outlet passage;

(2) an upper valve plug connected to the downwardly facing surface of the second diaphragm, the upper valve plug configured for engaging the upwardly facing valve seat to thereby stop the flow of fluids from the inlet through the first outlet passage; and (3) a valve stem having one end integrally formed with one of the upper or lower valve plugs, the valve stem extending through a center portion of the valve body, with the other end of the valve stem removably connected to the other valve plug, wherein the connection forms a fluid-tight seal between the valve stem and the plug;

(j) spring means mounted in a space between the third diaphragm and the base for biasing the poppet assembly and connected second and third diaphragms in an upwardly direction for engaging the lower valve plug with the downwardly facing valve seat to thereby stop the flow of fluids from the inlet through the second outlet passage, while, at the same time, disengaging the upper valve plug from the upwardly facing valve seat to allow flow of fluids from the inlet through the first outlet passage;

(k) means for counteracting the spring force for moving the poppet assembly and the connected second and third diaphragms in a downwardly direction for engaging the upper valve plug with the upwardly facing valve seat to stop the flow of fluids from the inlet through the first outlet passage;

(l) an annular backup ring mounted in the upper fluid containment chamber, the backup ring having a vertical hole through its center defining an inner peripheral surface and having an outside peripheral surface, the ring having a channel through it from its inside peripheral surface to its outside peripheral surface for passage of any fluids which may leak into the chamber through the second diaphragm; and (m) a leak detection passage extending from the region of the upper containment chamber surrounding the peripheral outside surface of the backup ring through the valve body to the exterior surface of said valve body for the passage of fluids which may leak through the second diaphragm into the upper containment chamber.

31. A valve assembly as claimed in claim 30, wherein the cap has a port through its center for entry of a fluid for actuating the valve.

32. A valve assembly as claimed in claim 30, wherein the first, second and third diaphragms are circular in construction and are in registration with each other, one above the other.

33. A valve assembly as claimed in claim 30, wherein a space is formed between the third diaphragm and the base, the space defining a lower fluid containment chamber.

34. A valve assembly as claimed in claim 33, wherein the valve additionally comprises a leak detection passage extending from the lower containment chamber through the valve body to its exterior surface for the passage of fluids which may leak through the third diaphragm into the lower containment chamber.

35. A valve assembly as claimed in claim 30, wherein the upper containment chamber backup ring comprises an outer peripheral portion extending between the first and second diaphragms, wherein the bottom surface of the ring contacts an annular segment of the upwardly facing surface of the second diaphragm, said annular segment extending from the outer peripheral edge of the second diaphragm radially inwardly a selected distance.

36. A valve assembly as claimed in claim 30, wherein the valve stem has a bore along the center of its length which is in registry with bores through the centers of the valve plugs,
an elongated bolt extends through the stem and valve plug bores with the threaded end of the bolt extending from the lower valve plug bore,
a nut is on the bolt threads to firmly hold the stem and valve plugs together, and
the nut includes a downwardly extending cylindrical extension.

37. A valve assembly as claimed in claim 36, wherein the spring means in the lower containment chamber comprises a pair of coil springs, one of the springs having a larger diameter than the other, with the smaller diameter spring nested within the larger diameter spring, wherein the downwardly extending cylindrical extension on the nut extends into the smaller diameter coil.

38. A valve assembly as claimed in claim 30, wherein the inside surfaces of the top and bottom portions of the valve body are tapered outwardly, an upwardly facing annular groove is around the base of the taper in the top portion of the valve body and a downwardly facing annular groove is around the base of the taper in the bottom portion of the valve body, wherein the second and third diaphragms have flanges extending axially from their peripheral edges, the flange of the second diaphragm being mounted in the upwardly facing annular groove and the flange of the third diaphragm being mounted in the downwardly facing annular groove, wherein the diameter of the first and second diaphragms is a selected amount greater than the diameter of the annular grooves, so that when the diaphragm flanges are mounted in the annular grooves, the diaphragm surfaces are slack.

39. A valve assembly as claimed in claim 30, wherein the surface area of the second diaphragm exposed to the pressure of fluid flowing through the valve is substantially the same as the surface area of the third diaphragm which is exposed to such fluid pressure, wherein the resulting upward force on the second diaphragm provided by such fluid is balanced by the downward force provided by the fluid on the third diaphragm.

40. A valve assembly as claimed in claim 30, wherein the upper valve plug is integrally formed with the second diaphragm and the lower valve plug is integrally formed with the third diaphragm, and annular V-shaped grooves are around the base of each of the valve plugs between the plugs and the diaphragms.

41. A valve assembly as claimed in claim 30 additionally comprising an annular backup ring mounted in the lower containment chamber, wherein tightening means is on the backup ring to eliminate the slack in the surface of the third diaphragm.

42. A valve assembly as claimed in claim 30 additionally comprising an annular backup ring mounted in the lower containment chamber, the ring having a channel through it from its inside peripheral surface to its outside peripheral surface for passage of fluids which may leak through the third diaphragm, the backup ring extending between the inner surface of the base and the third diaphragm, wherein the top surface of the ring contacts an annular segment of the downwardly facing surface of the third diaphragm, the annular segment extending from the outer peripheral edge of the third diaphragm radially inwardly a selected distance, wherein the portion of the top surface of the ring which is in contact with the annular segment when the valve is closed slopes upwardly from the periphery of the ring toward its center.

43. A valve assembly as claimed in claim 30, wherein each such valve seat is in the form of a ridge having dimensions sufficient to flex outwardly when engaged to the associated valve plug to thereby enhance the seal between the valve plug and seat when they are engaged.

* * * * *